United States Patent
Wang et al.

(10) Patent No.: US 9,572,122 B2
(45) Date of Patent: Feb. 14, 2017

(54) METHODS FOR COMMUNICATION APPARATUS TO ALIGN A FRAME BOUNDARY WITH A CELL AND COMMUNICATION APPARATUS UTILIZING THE SAME

(71) Applicant: MediaTek Inc., Hsin-Chu (TW)

(72) Inventors: Chih-Yuan Wang, Hsinchu (TW); Yen-Hui Yeh, Jhudong Township, Hsinchu County (TW); Huei-Ya Chang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 133 days.

(21) Appl. No.: 14/132,222

(22) Filed: Dec. 18, 2013

(65) Prior Publication Data

US 2015/0172087 A1 Jun. 18, 2015

(51) Int. Cl.
*H04W 56/00* (2009.01)
*H04L 27/26* (2006.01)

(52) U.S. Cl.
CPC ...... *H04W 56/0015* (2013.01); *H04L 27/2656* (2013.01); *H04W 56/00* (2013.01)

(58) Field of Classification Search
CPC .............. H04L 27/2646; H04L 7/0016; H04W 56/0015
See application file for complete search history.

(56) References Cited

U.S. PATENT DOCUMENTS

| 2011/0007718 A1* | 1/2011 | Swarts et al. ................. 370/336 |
| 2011/0237214 A1* | 9/2011 | Swarts et al. .............. 455/226.1 |

\* cited by examiner

*Primary Examiner* — Mohammad Anwar
(74) *Attorney, Agent, or Firm* — McClure, Qualey & Rodack, LLP (57) ABSTRACT

A method for a communication apparatus to align a frame boundary with a cell. A first time at which a predetermined synchronization signal is supposed to be received is determined after knowing a timing of the cell. The predetermined synchronization signal is a primary synchronization signal or a secondary synchronization signal. A second time at which the predetermined synchronization signal is actually received is determined. A first offset between the first time and the second time is determined. A timing of a local time base utilized by the communication apparatus according to the first offset is adjusted such that a frame boundary of the local time base and a frame boundary of the cell are aligned.

15 Claims, 6 Drawing Sheets

METHODS FOR COMMUNICATION APPARATUS TO ALIGN A FRAME BOUNDARY WITH A CELL AND COMMUNICATION APPARATUS UTILIZING THE SAME

BACKGROUND OF THE INVENTION

Field of the Invention

The invention relates to a method for a communication apparatus to align a frame boundary with a cell.

Description of the Related Art

Orthogonal Frequency Division Multiplexing (OFDM) is a promising technology that is widely used in wireless communication systems, and converts a frequency selective channel to a collection of frequency-flat subchannels achieved by splitting the input high-rate data stream into a number of low-rate substreams. In order to enhance the efficiency of the frequency allocation, the technique of Orthogonal Frequency Division Multiple Access (OFDMA) is proposed to allow multiple users to access a same channel, by dividing available subcarriers into mutually exclusive clusters assigned to distinct users for simultaneous transmission. The orthogonality of the subcarriers guarantees intrinsic protection against multiple access interference, while the adoption of a dynamic subcarrier assignment strategy provides the system with high flexibility in resource management. OFDMA has become a promising technique for use in next-generation broadband wireless networks.

With more fine frequency allocation, OFDMA signal demodulation is extremely sensitive to timing errors and carrier frequency offsets. Inaccurate compensation of the frequency offset destroys the orthogonality among subcarriers and produces inter-carrier interference (ICI). Timing errors result in inter-symbol interference (ISI) and produce severe error rate degradations.

Therefore, a method for a communication apparatus to align a frame boundary with a cell with enhanced alignment efficiency is highly required.

BRIEF SUMMARY OF THE INVENTION

Communication apparatuses and methods for a communication apparatus to align a frame boundary with a cell are provided. An exemplary embodiment of a communication apparatus comprises a radio frequency (RF) signal processing device and a baseband signal processing device. The RF signal processing device processes a plurality of RF signals received from a cell and converts the RF signals into a plurality of baseband signals. The baseband signal processing device processes the baseband signals based on a local time base after synchronizing a timing of the local time base with a timing of the cell. The baseband signal processing device further retrieves a predetermined synchronization signal from the baseband signals and adjusts the timing of the local time base based on the predetermined synchronization signal to align a frame boundary of the local time base with a frame boundary of the cell. The predetermined synchronization signal is a primary synchronization signal or a secondary synchronization signal.

An exemplary embodiment of a method for a communication apparatus to align a frame boundary with a cell comprises determining a first time at which a predetermined synchronization signal is supposed to be received after knowing a timing of the cell, wherein the predetermined synchronization signal is a primary synchronization signal or a secondary synchronization signal; determining a second time at which the predetermined synchronization signal is actually received; determining a first offset between the first time and the second time; and adjusting a timing of a local time base utilized by the communication apparatus according to the first offset such that a frame boundary of the local time base and a frame boundary of the cell are aligned.

Another exemplary embodiment of a method for a communication apparatus to align a frame boundary with a cell comprises receiving a primary synchronization signal and a secondary synchronization signal from the cell to obtain a timing of the cell; synchronizing a timing of a local time base utilized by the communication apparatus with the timing of the cell; receiving the primary synchronization signal or the secondary synchronization signal again from the cell; determining a first time at which the primary synchronization signal or the secondary synchronization signal is supposed to be received; determining a second time at which the primary synchronization signal or the secondary synchronization signal is actually received; determining a first offset between the first time and the second time; and adjusting the timing of the local time base according to the first offset such that a frame boundary of the local time base and a frame boundary of the cell are aligned.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Generally, a communication apparatus performs a cell search procedure to identify a target cell to camp on and at least a neighbor cell to keep monitoring. In addition, the communication apparatus may further perform a cell synchronization with the target cell that the communication apparatus wants to camp on. Cell synchronization is the very first step when a communication apparatus wants to camp on any cell. From this, the communication apparatus acquires the physical cell id (PCI), time slot, and system frame number, which will enable the communication apparatus to know the timing of the cell and read system information blocks from a particular network.

Figure 1A:
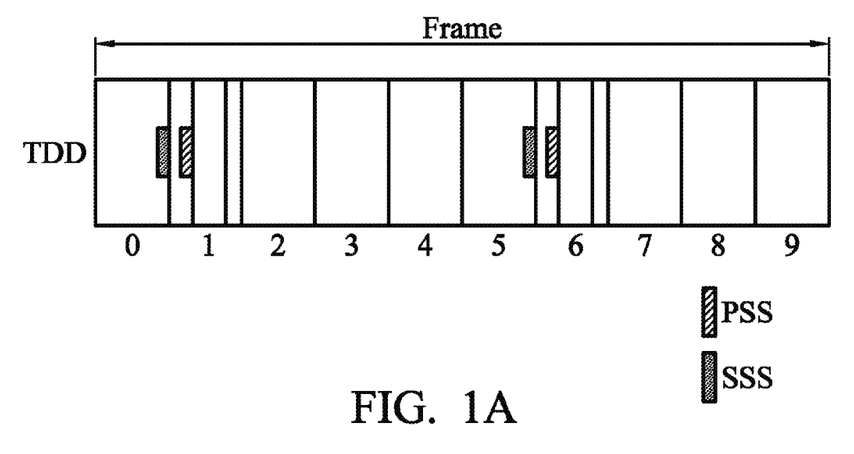
FIG. 1A shows an exemplary frame structure comprising PSS and SSS in Time-Division Duplexing (TDD) mode.
Figure 1B:
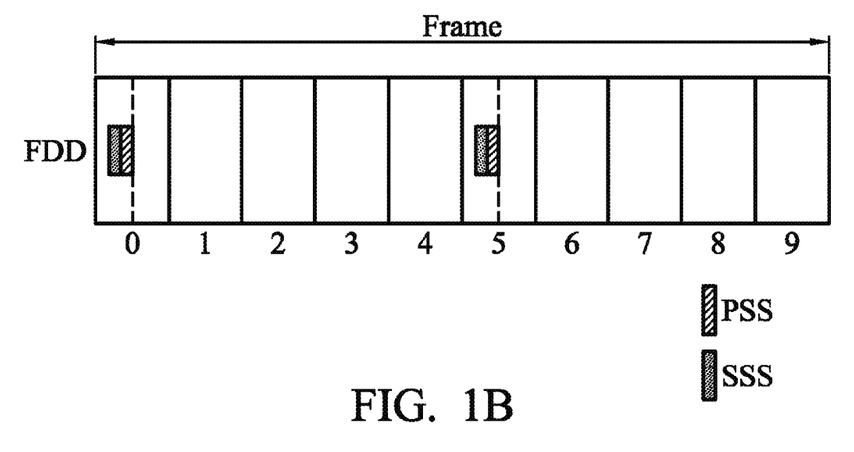
FIG. 1B shows an exemplary frame structure comprising PSS and SSS in Frequency-Division Duplexing (FDD) mode.

The communication apparatus may tune its radio to different frequency channels depending upon which bands it is supporting. Assuming that it is currently tuned to a specific band or channel, the communication apparatus first finds the primary synchronization signal (PSS) which is located in a time slot of the first sub-frame (labeled by sub-frame 0) of the radio frame as shown in FIG.1A and FIG. 1B, wherein FIG. 1A shows an exemplary frame structure comprising PSS and SSS in TDD mode and FIG. 1B shows an exemplary frame structure comprising PSS and SSS in FDD mode. This enables the communication apparatus to be synchronized on a sub-frame level. The PSS is repeated in sub-frame 5 which means the communication apparatus is synchronized on a 5 ms basis since each sub-frame is 1 ms. From PSS, the communication apparatus is also able to obtain a physical layer identity.

In the next step, the communication apparatus finds the secondary synchronization signal (SSS). SSS symbols are also located in the same sub-frame of PSS but in the symbol before PSS as shown in FIG. 1A and FIG. 1B. From SSS, the communication apparatus is able to obtain a physical layer cell identity group number.

Figure 2:
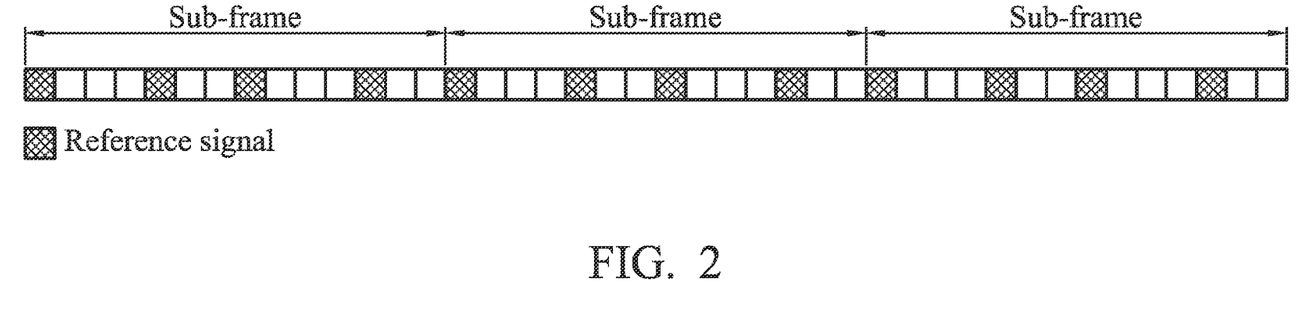
FIG. 2 shows an exemplary sub-frame structure comprising Reference signal.

Using the physical layer identity and the cell identity group number, the communication apparatus knows the PCI for this cell now. Once the communication apparatus knows the PCI for a given cell, it also knows the location of cell Reference signals, which is a pilot signal, as shown in FIG. 2.

Conventionally, after camping on a cell (also called a serving cell), the timing of the communication apparatus is synchronized with the serving cell and the communication apparatus no longer has to listen to the Primary Synchronization channel (P-SCH) and Secondary Synchronization channel (S-SCH) to receive the PSS and SSS. Even if the PSS and the SSS are received while the communication apparatus is receiving some other signals, the received PSS and the SSS are always discarded. However, unlike in conventional designs, in the proposed frame boundary alignment methods, the PSS and SSS are further utilized after the cell synchronization is completed to enhance the boundary alignment efficiency. Details of the methods and the communication apparatus utilizing the same are discussed in the following paragraphs.

Figure 3:
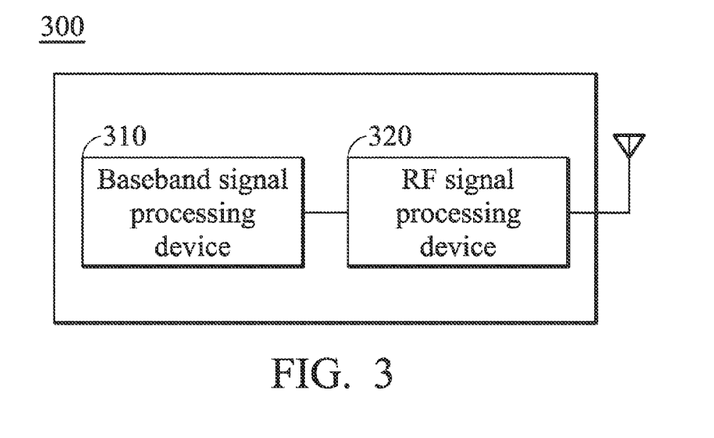
FIG. 3 shows a block diagram of a communication apparatus according to an embodiment of the invention.

FIG. 3 shows a block diagram of a communication apparatus according to an embodiment of the invention. The communication apparatus 300 may be a notebook, a cellular phone, a portable gaming device, a portable multimedia player, a Global Positioning System (GPS), a receiver, a personal digital assistant, a tablet computer, or others. The communication apparatus 300 may comprise at least a baseband signal processing device 310, a radio frequency (RF) signal processing device 320 and an antenna module comprising at least one antenna. The RF signal processing device 320 may receive RF signals via the antenna, and process the received RF signals to convert the received RF signals to baseband signals to be processed by the baseband signal processing device 310, or receive baseband signals from the baseband signal processing device 310 and convert the received baseband signals to RF signals to be transmitted to a peer communication apparatus. The RF signal processing device 320 may comprise a plurality of hardware elements to perform radio frequency conversion. For example, the RF signal processing device 320 may comprise a mixer to multiply the baseband signals with a carrier oscillated in the radio frequency of the wireless communication system, such as a Long Term Evaluation (LTE) system.

The baseband signal processing device 310 may further process the baseband signals. The baseband signal processing device 310 may also comprise a plurality of hardware elements to perform baseband signal processing. Note that in order to clarify the concept of the invention, FIG. 3 presents a simplified block diagram, in which only the elements relevant to the invention are shown. However, note that the invention should not be limited what is shown in FIG. 3.

As discussed above, after the cell synchronization is completed, the timing of the cell is known by the communication apparatus 300. Therefore, the system frame number of the cell is known by the communication apparatus 300, and the communication apparatus 300 may maintain a local system frame number synchronized with that of the cell. The communication apparatus 300 may use a local time base, with the timing synchronized with the timing of the cell, to maintain the local system frame number. Therefore, the communication apparatus 300 can receive the desired signals from the cell at a predefined time based on the local time base.

According to an embodiment of the invention, after the cell synchronization has completed, the baseband signal processing device 310 may further use the PSS or the SSS as shown in FIG. 1A and FIG. 1B to align a frame boundary of the local time base with a frame boundary of the cell. Note that in the embodiments of the invention, the proposed concept of using the PSS or the SSS to align frame boundaries may be applied to either a serving cell that the communication apparatus 300 camps on or a neighbor cell that the communication apparatus 300 keeps monitoring.

Figure 4:
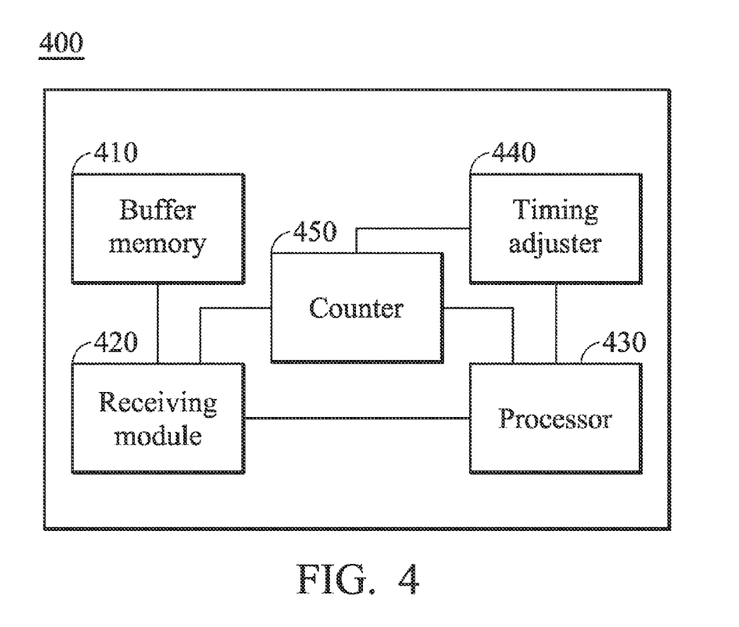
FIG. 4 shows an exemplary block diagram of a baseband signal processing device according to an embodiment of the invention.

FIG. 4 shows an exemplary block diagram of a baseband signal processing device according to an embodiment of the invention. The baseband signal processing device 400 may comprise a buffer memory 410, a receiving module 420, a processor 430, a timing adjuster 440 and a counter 450. Note that in order to clarify the concept of the invention, FIG. 4 presents a simplified block diagram, in which only the elements relevant to the invention are shown. However, note that the invention should not be limited what is shown in FIG. 4.

The counter 450 may keep counting a count value to act as the local time base. The RF signal processing device 320 and baseband signal processing device 310 and 400 may operate based on the local time base. For example, the RF signal processing device 320 may be scheduled to receive and transmit RF signals when the count value meets a predetermined count value. In another example, the baseband signal processing device 310 and 400 may be scheduled to retrieve a desired signal or data from the baseband signals at the right time, or process the baseband signals based on the count value.

The buffer memory 410 may store the baseband signals for processing. The receiving module 420 may be coupled to the buffer memory 410 for retrieving the PSS or the SSS from the baseband signals. Note that since cell synchronization with respect to the cell is completed, the timing of the cell is known and the location of the PSS and the SSS are known. Therefore, unlike performing a blind search before the cell synchronization is completed, the receiving module 420 may now directly retrieve the PSS or the SSS from the baseband signals based on the known locations.

The processor 430 may determine a first time at which the PSS or the SSS is supposed to be received based on the timing of the cell and the local time base and the obtain a second at which the PSS or the SSS is actually received by the communication apparatus from the receiving module 420, and further determine a first offset between the first time and the second time. Here, the first time and the second time may be represented by the count value of the counter 450, as discussed above. For example, suppose that the PSS is supposed to be received at a predetermined count value 100, the first time may be set to the predetermined count value 100. Next, after retrieving the PSS, the processor 430 may further obtain timing information, which indicates that the PSS is actually received by the communications apparatus 300 at a count value 110, from the receiving module 420. Therefore, the second time may be set to the predetermined count value 110. The processor may further determine the first offset as (110−100=10) counts of the counter 450, thereby knowing that the timing of the local time base leads the timing of the cell for 10 counts.

The timing adjuster 440 may be coupled to the processor 430 and the counter 450 for receiving information regarding the first offset and adjusting the timing of the local time base (for example, adjusting the count value of the counter 450) based on the first offset. Continuing the example as discussed above, when the information indicates that the timing of the local time base leads the timing of the cell for 10 counts, the timing adjuster 440 may adjust the timing of the local time base by decreasing a current count value by 10 counts.

Figure 5:
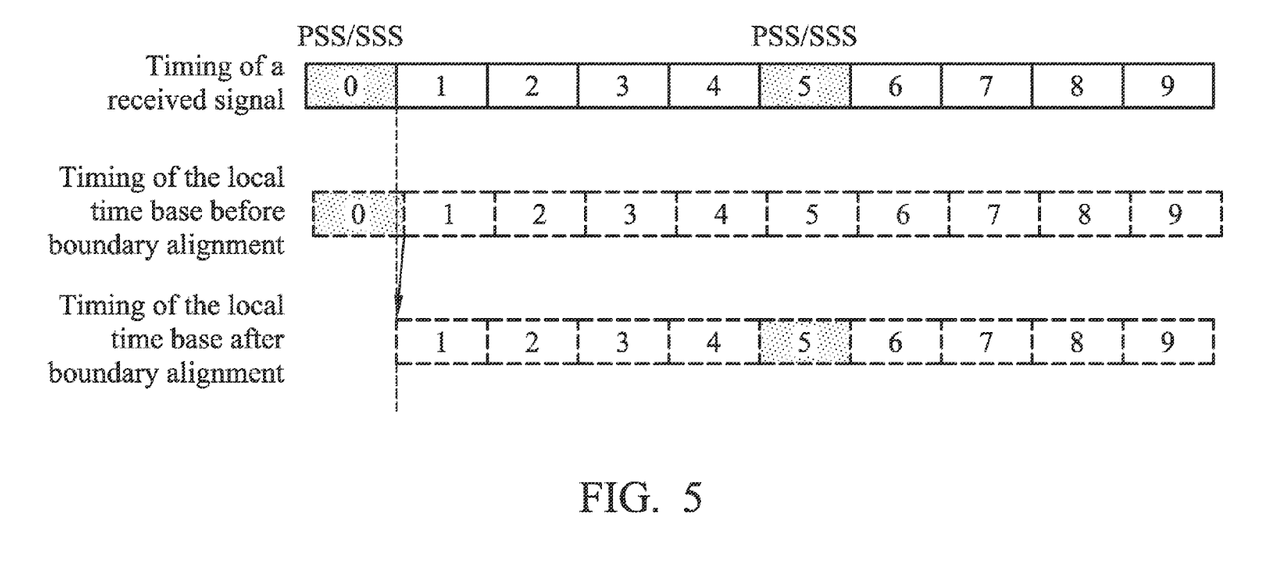
FIG. 5 is an exemplary timing diagram showing a concept of adjusting the timing of the local time base when the timing of the local time base leads the timing of the cell according to an embodiment of the invention.

FIG. 5 is an exemplary timing diagram showing a concept of adjusting the timing of the local time base when the timing of the local time base leads the timing of the cell according to an embodiment of the invention. The first row shows the timing of a received signal, which is actually received by the communication apparatus from the cell. The second row shows the timing of the local time base before boundary alignment. The third row shows the timing of the local time base after boundary alignment. When retrieving the PSS or SSS from sub-frame 0, the processor 430 may determine the first offset based on the timing of the actually received PSS or SSS as shown in the first row and the timing of the local time base as shown in the second row. Therefore, the timing adjuster 440 may adjust the timing of the local time base to align the frame boundary of local time base with that of the cell right in the sub-frame 1 as shown in the third row.

Figure 6:
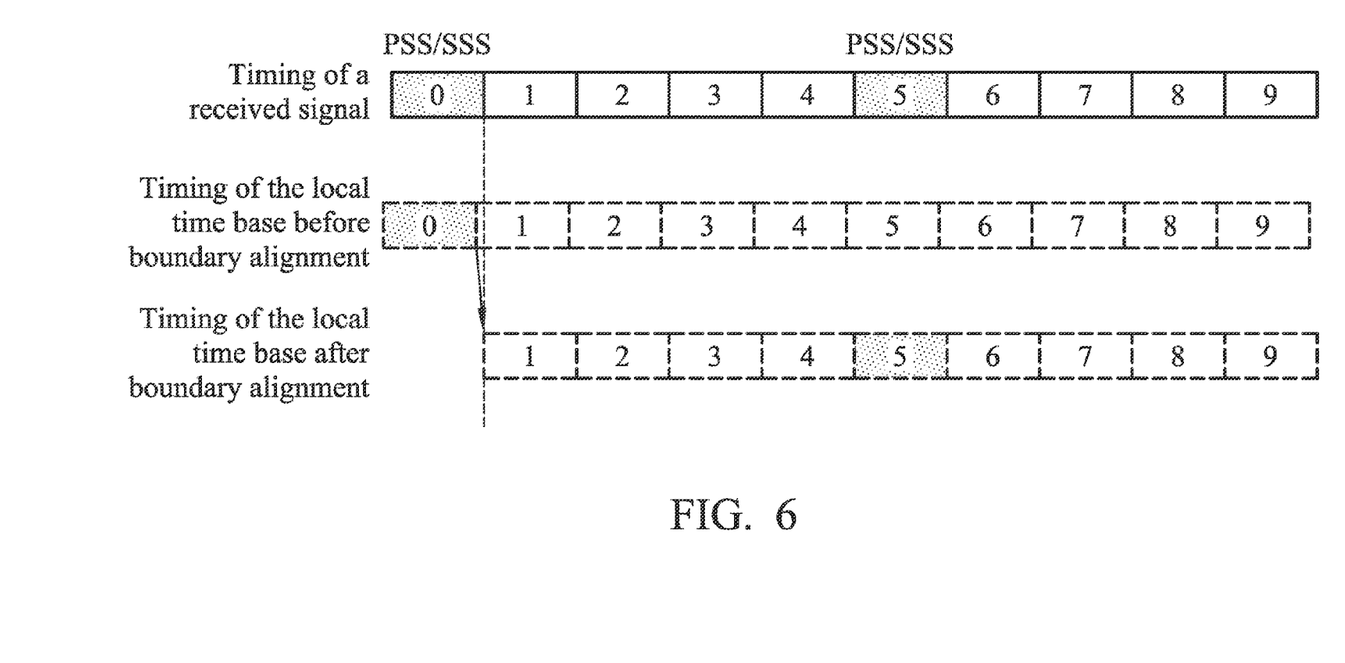
FIG. 6 is an exemplary timing diagram showing a concept of adjusting the timing of the local time base when the timing of the local time base lags the timing of the cell according to an embodiment of the invention.

FIG. 6 is an exemplary timing diagram showing a concept of adjusting the timing of the local time base when the timing of the local time base lags the timing of the cell according to an embodiment of the invention. Similarly as the leading case shown in FIG. 5, when retrieving the PSS or SSS from sub-frame 0, the processor 430 may determine the first offset based on the timing of the actually received PSS or SSS as shown in the first row and the timing of the local time base as shown in the second row. After that, the timing adjuster 440 may adjust the timing of the local time base according to the first offset to align the frame boundary of local time base with that of the cell right in the sub-frame1 as shown in the third row.

Figure 7:
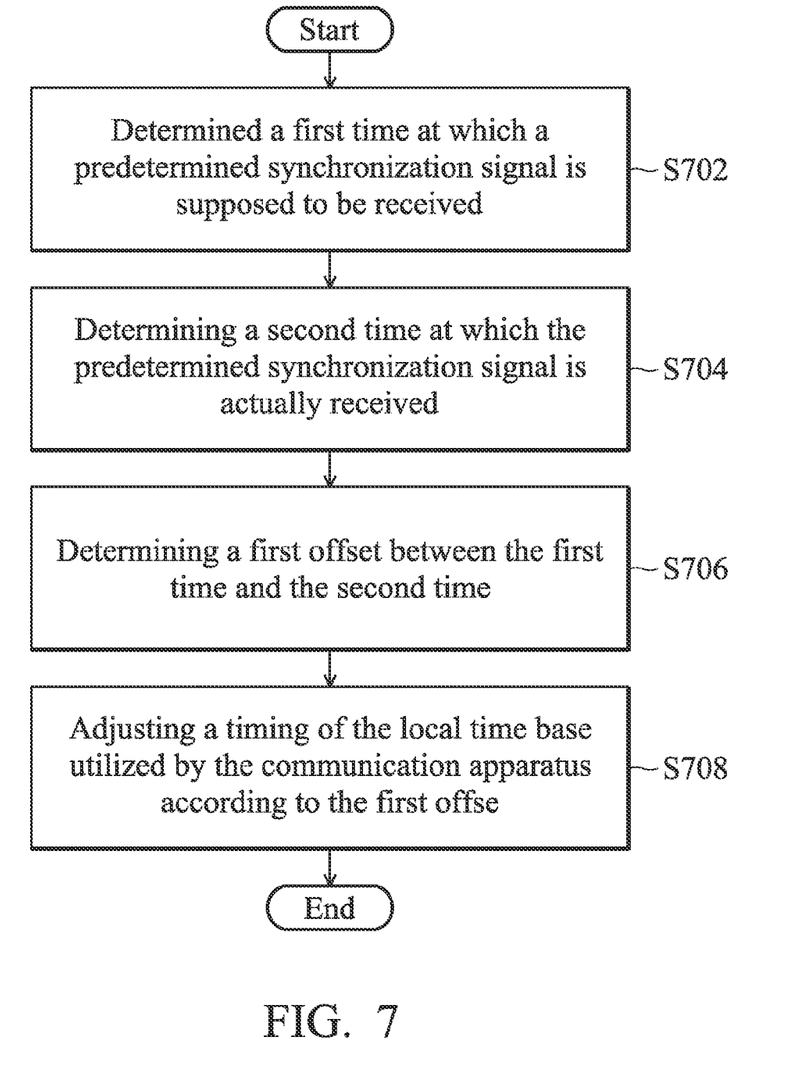
FIG. 7 shows a flow chart of a method for a communication apparatus to align a frame boundary with a cell according to an embodiment of the invention.

FIG. 7 shows a flow chart of a method for a communication apparatus to align a frame boundary with a cell according to an embodiment of the invention. A first time at which a predetermined synchronization signal is supposed to be received is determined (Step S702). The predetermined synchronization signal may be the PSS or the SSS as discussed above. Note that according to an embodiment of the invention, the step S702 may be performed after receiving the PSS and SSS from the cell for the first time to obtain a timing of the cell and synchronizing a timing of a local time base utilized by the communication apparatus with the timing of the cell. In addition, the step S702 may be performed before or after receiving the PSS or the SSS, again, from the cell.

Next, a second time at which the predetermined synchronization signal is actually received is determined (Step S704). Next, a first offset between the first time and the second time is determined (Step S706). Finally, a timing of a local time base utilized by the communication apparatus is adjusted according to the first offset, such that a frame boundary of the local time base and a frame boundary of the cell are aligned (Step S708).

Note that according to an embodiment of the invention, the PSS or SSS may be repeated received for several times in different frames. In this manner, steps S702~S704 may be repeatedly performed at different time based on the PSS or SSS received in different frames.

According to another embodiment of the invention, besides the PSS and the SSS, the Reference signal as shown in FIG. 2 may also be utilized accompanying with the PSS/SSS. Note that the Reference signal is a pilot signal transmitted by the cell. In an embodiment of the invention, the receiving module 420 may retrieve the Reference signal, which is supposed to be received at a third time, from the baseband signals based on the timing of the cell and the local time base. The processor 430 may determine a third time at which the Reference signal is supposed to be received based on the timing of the cell and the local time base and the obtain a fourth at which the Reference signal is actually received from the receiving module 420, and further determine a second offset between the third time and the fourth time. After that, timing adjuster 440 may adjust the timing of the local time base according to the second offset.

In some embodiments of the invention, the timing adjuster 440 may adjust the timing of the local time base according to both the first offset and the second offset. For example, the timing adjuster 440 may adjust the timing of the local time base according to a calculation result, such as an average, of the first offset and the second offset. The calculation result may be flexibly designed based on different system requirements. In other embodiments of the invention, the timing adjuster 440 may also adjust the timing of the local time base selectively according to the first offset or the second offset. For example, when the second offset exceeds a predetermined value, the timing adjuster 440 adjusts the timing of the local time base according to the first offset since the PSS and SSS may contribute a wider dynamic range for boundary adjustment. In still other embodiments of the invention, the amount of adjustment made by timing adjuster 440 may not have to be exactly the same as the amount of timing difference indicated by the first offset and the second offset.

Since the PSS and SSS, or further the PSS/SSS combining the Reference signal, are utilized for boundary alignment after the cell synchronization is completed, the efficiency and accuracy of boundary alignment are greatly improved.

The above-described embodiments of the present invention can be implemented in any of numerous ways. For example, the embodiments may be implemented using hardware, software, or a combination thereof. It should be appreciated that any component or collection of components that perform the functions described above can be generically considered as one or more processors that control the above-discussed function. The one or more processors can be implemented in numerous ways, such as with dedicated hardware, or with general-purpose hardware that is programmed using microcode or software to perform the functions recited above.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communication apparatus, comprising:
   a radio frequency (RF) signal processing device, for processing a plurality of RF signals received from a cell and converting the RF signals into a plurality of baseband signals; and
   a baseband signal processing device, for processing the baseband signals based on a local time base after synchronization between a timing of the local time base and a timing of the cell is completed,
   wherein the baseband signal processing device further retrieves a predetermined synchronization signal from the baseband signals and retrieves a predetermined reference signal, and adjusts the timing of the local time base based on the predetermined synchronization signal and the predetermined reference signal to align a frame boundary of the local time base with a frame boundary of the cell after a cell search procedure, and
   wherein the predetermined synchronization signal is a primary synchronization signal or a secondary synchronization signal.

2. The communication apparatus as claimed in claim 1, wherein the baseband signal processing device comprises:
   a buffer memory, for storing the baseband signals;
   a receiving module, coupled to the buffer memory for retrieving the predetermined synchronization signal, which is supposed to be received at a first time, from the baseband signals;
   a processor, coupled to the receiving module for obtaining a second time at which the predetermined synchronization signal is actually received and determining a first offset between the first time and the second time; and
   a timing adjuster, for adjusting the timing of the local time base according to the first offset.

3. The communication apparatus as claimed in claim 2, wherein the receiving module further retrieves the predetermined reference signal, which is supposed to be received at a third time, from the baseband signals, the processor further obtains a fourth time at which the predetermined reference signal is actually received and determines a second offset between the third time and the fourth time, and the timing adjuster further adjusts the timing of the local time base according to the second offset.

4. The communication apparatus as claimed in claim 3, wherein the predetermined reference signal is a pilot signal.

5. The communication apparatus as claimed in claim 1, wherein the cell is selected from a group comprising a serving cell that the communication apparatus camps on and a neighbor cell monitored by the communication apparatus.

6. The communication apparatus as claimed in claim 1, wherein the baseband signal processing device further retrieves the predetermined synchronization signal transmitted by the cell in different frames and repeatedly adjusts the timing of the local time base based on the predetermined synchronization signal received in different frames so as to repeatedly align the frame boundaries.

7. A method for a communication apparatus to align a frame boundary with a cell, comprising:
   determining a first time at which a predetermined synchronization signal and a reference signal are supposed to be received after knowing a timing of the cell, wherein the predetermined synchronization signal is a primary synchronization signal or a secondary synchronization signal;
   determining a second time at which the predetermined synchronization signal and the reference signal are actually received;
   determining a first offset between the first time and the second time; and
   adjusting a timing of a local time base utilized by the communication apparatus according to the first offset signal after a cell search procedure such that a frame boundary of the local time base and a frame boundary of the cell are aligned.

8. The method as claimed in claim 7, wherein the cell is selected from a group comprising a serving cell that the communication apparatus camps on and a neighbor cell monitored by the communication apparatus.

9. The method as claimed in claim 7, further comprising:
   determining a third time at which the predetermined reference signal is supposed to be received, wherein the predetermined reference signal is a pilot signal;
   determining a fourth time at which the predetermined reference signal is actually received;
   determining a second offset between the third time and the fourth time; and
   adjusting the timing of the local time base further according to the second offset.

10. The method as claimed in claim 7, further comprising:
    receiving the predetermined synchronization signal in different frames,
    wherein the steps of determining the first time, determining the second time, determining the first offset and adjusting the timing of the local time base are repeatedly performed at different times based on the predetermined synchronization signal received in different frames.

11. A method for a communication apparatus to align a frame boundary with a cell, comprising:
    receiving a primary synchronization signal, a secondary synchronization signal and a reference signal from the cell to obtain a timing of the cell;
    synchronizing a timing of a local time base utilized by the communication apparatus with the timing of the cell;
    receiving the primary synchronization signal or the secondary synchronization signal or the reference signal again from the cell;
    determining a first time at which the primary synchronization signal or the secondary synchronization signal or the reference signal is supposed to be received;
    determining a second time at which the primary synchronization signal or the secondary synchronization signal or the reference signal is actually received;
    determining a first offset between the first time and the second time; and adjusting the timing of the local time base according to the first offset after a cell search procedure such that a frame boundary of the local time base and a frame boundary of the cell are aligned.

12. The method as claimed in claim 11, wherein the cell is selected from a group comprising a serving cell that the communication apparatus camps on and a neighbor cell monitored by the communication apparatus.

13. The method as claimed in claim 11, further comprising:
- determining a third time at which the predetermined reference signal is supposed to be received, wherein the predetermined reference signal is a pilot signal;
- determining a fourth time at which the predetermined reference signal is actually received;
- determining a second offset between the third time and the fourth time; and
- adjusting the timing of the local time base further according to the second offset.

14. The method as claimed in claim 11, wherein the step of receiving the primary synchronization signal or the secondary synchronization signal again from the cell are repeatedly performed in different frames.

15. The method as claimed in claim 14, wherein the steps of determining the first time, determining the second time, determining the first offset and adjusting the timing of the local time base are repeatedly performed at different time based on the primary synchronization signal or the secondary synchronization signal received in different frames.

* * * * *